March 23, 1954 — M. G. BALES — 2,672,890
PRESSURE ACTUATED CONTROL MECHANISM
Filed May 13, 1950
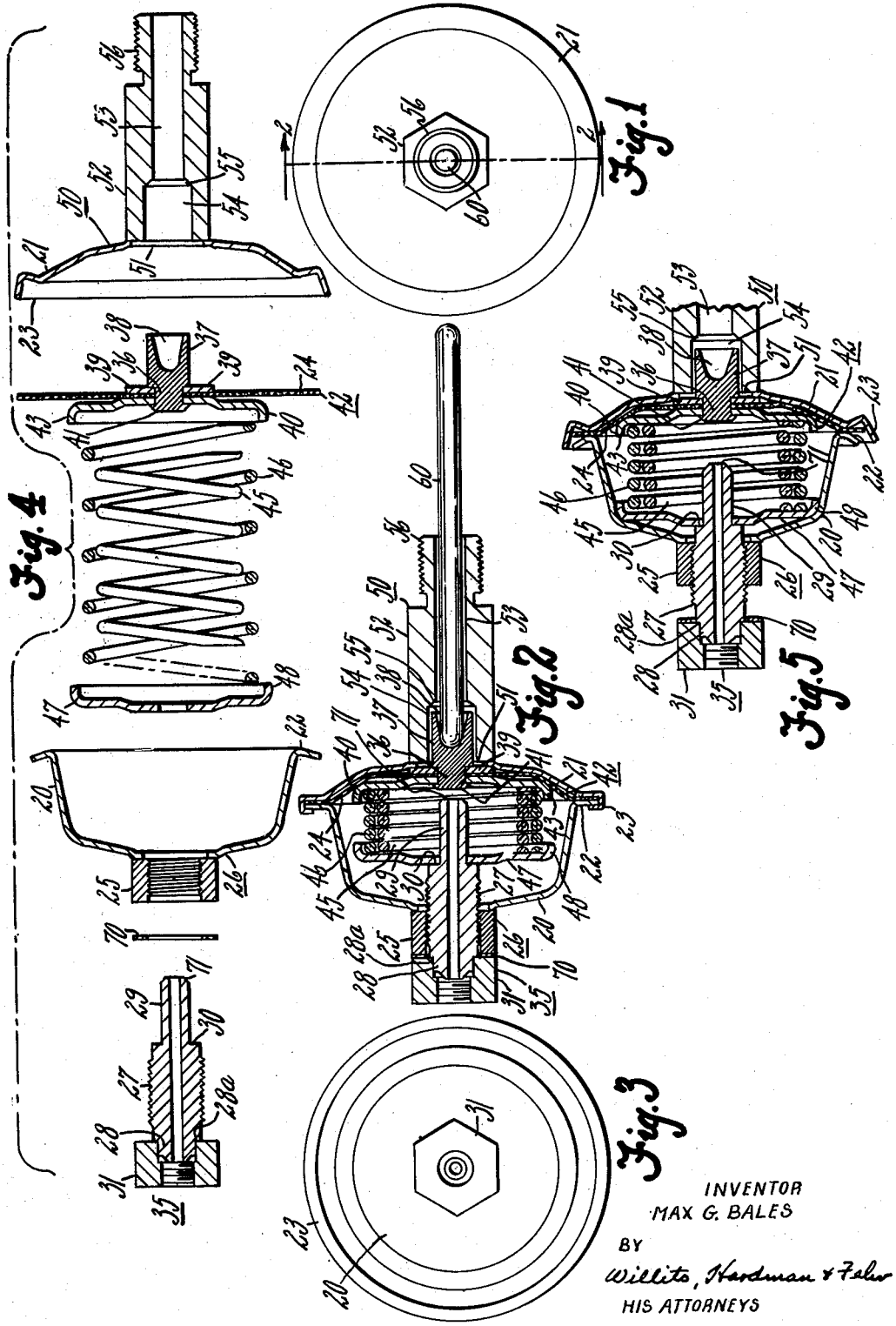
INVENTOR
MAX G. BALES
BY
Willits, Hardman & Feher
HIS ATTORNEYS Patented Mar. 23, 1954

2,672,890

UNITED STATES PATENT OFFICE 2,672,890

PRESSURE ACTUATED CONTROL MECHANISM

Max G. Bales, Anderson, Ind., assignor to General Motors Corporation, Detroit, Mich., a corporation of Delaware Application May 13, 1950, Serial No. 161,891

4 Claims. (Cl. 137—790)

This invention relates to improvements in a pressure control mechanism and more particularly to a control mechanism having a diaphragm actuated by a source of suction.

It is among the objects of the present invention to provide a control mechanism of simple and compact design; to facilitate the manufacture thereof; to reduce cost of manufacture thereof; and to provide for adjustment of a control spring whereby to control the movements of a diaphragm in one direction. These and other objects of the invention are accomplished by providing a casing formed of two housing members one of which receives a threaded hollow screw which extends into said housing member and supports a spring seat upon which rests the control spring whereby when the adjusting member moves into said housing it will compress the control spring and when said adjustable member is in its final position it will operate as a stop to limit the movement of a diaphragm in one direction.

Further objects and advantages of the present invention will be apparent from the following description, reference being had to the accompanying drawings wherein a preferred embodiment of the present invention is clearly shown.

In the drawings:

Fig. 1 is an end view of a control mechanism embodying the present invention;

Fig. 2 is a sectional view taken on line 2—2 of Fig. 1;

Fig. 3 is a view of the opposite end of the control mechanism.

Fig. 4 is an exploded view showing detail structure of parts and subassemblies in cross section.

Fig. 5 is a sectional view of the parts in cross section showing the relative positions of the parts prior to the securing of the housing members together.

Referring to the drawing, the control mechanism for automatically controlling a device in accordance with engine suction comprises a suction unit made up of two cup-shaped diaphragm housing members 20 and 21. The housing member 20 is provided with a substantially flat peripheral flange 22. The housing member 21 is provided with an annular flange 23 adapted to be spun around the flange 22 for assembling the two housing members together to form the housing for the control mechanism unit. A diaphragm 24, made of any suitable flexible material, such as synthetic rubber coated fabric, and the like, has its peripheral edge clamped within the annular flange 23 of housing 21 together with the flange 22 of disc 20.

The housing 20 is provided with a central opening about which is secured an internally threaded bushing 25 by brazing to form a subassembly 26 comprising the housing member 20 and bushing 25. The bushing 25 receives an externally threaded tubular screw 27, the purpose of which is hereinafter described having at one end a reduced portion 28 to form a shoulder 28a. The reduced portion fits into a counterbore of a nut 31 and fixed thereto by brazing to form a subassembly 35. The other end of the screw 27 is reduced at 29 to form a seat or shoulder 30. The left end of the reduced portion 28 has a tapered seat adapted to be engaged by a flared end of a standard conduit and retaining fitting, not shown when the fitting is threaded into the nut.

The diaphragm 24 is provided with a central opening to receive a reduced shank 36 of a headed rivet 37. The head of the rivet is provided with a recess 38 the purpose of which will be described hereinafter. The shank 36 passes through a washer 39, the opening of the diaphragm 24 and a central opening of a spring seat 40 and riveted over as at 41 whereby to clamp tightly the diaphragm between the washer 39 and the spring seat 40 to form a diaphragm subassembly 42.

The spring seat 40 is provided with a peripheral flange 43. The seat provides an abutment for one end of load springs 45 and 46. The present device uses two springs instead of one so as to reduce the longitudinal length of housing members 20 and 21. The other end of the springs rest upon a second spring seat 47 having a peripheral flange 48. The spring seat 47 is provided with a central opening to receive the reduced portion 29 of screw 27 with the seat 47 resting on the shoulder 30.

The springs 45 and 46 normally urge diaphragm 24 toward the diaphragm housing member 21. The housing 21 has a central opening 51 about which a tubular mounting bracket or ferrule 52 is attached to the exterior thereof by brazing to form a subassembly 50. The ferrule 52 has a longitudinal passage 53 enlarged at 54 to form an internal shoulder 55. The enlarged portion of the passage receives loosely the head of rivet 37. The ferrule 52 has a reduced external threaded portion 56 adapted to be threaded in a tapped hole of a frame, not shown, to support the central mechanism in position on the frame.

An operating rod 60 is slidably mounted in the passage 53 and has one end extending into the recess 38 of rivet 37 so that the diaphragm operates the rod. The opposite end of the rod 60 is to be connected with a device, not shown, to be operated by the rod. The rivet 37 and rod 60 have a loose fit within the passages of the ferrule so that the atmospheric pressure may act on one side of the diaphragm 24 against the lower pressure on the other side thereof to effect movement of the diaphragm against the tension of the springs.

The tension of the springs is regulated by the screw 27. The amount of compression of the springs will depend on the amount the screw is turned to move the second spring seat 47 away from the bottom of the housing 20. The inward movement of the screw 27 is controlled by an annular shim 70. In the present instance only one shim is shown and it is disposed between the nut 31 and bushing 25. The shim 70 also operates to hold frictionally the screw in position after the screw is tightened in position. As will be seen the end 71 of the screw 27 is spaced a certain distance from the rivet and acts as a stop to limit the movement of the diaphragm toward the housing 21. The washer 39 cooperates with the housing 20 to limit the movement of the diaphragm by the springs 45 and 46.

It is to be noted that by the virtue of the construction of parts a very compact control mechanism is had. Further by providing subassemblies for certain parts this will facilitate manufacture and reduce the cost of manufacture.

The method of assembling the control mechanism is accomplished by first placing a shim 70 over the screw 27 so that it will rest on the nut 31. The next step is to thread screw 27 into the bushing 25 of subassembly 26 far enough so that the shoulder 30 will extend within the housing 20. The housing is then placed in a suitable support after which the seat 47 is mounted on the screw so that it will rest upon the shoulder 30. The springs 45 and 46 are then positioned on the seat 47. The diaphragm assembly 42 is placed over the spring so that the spring seat 48 will rest upon the end of the springs. When these parts are in proper position the sub-assembly including the housing 21 and ferrule 52 is placed over the diaphragm with the head of rivet 37 extending loosely in the enlarged portion 54 of the passage 53 of the ferrule 52. By suitable means the sub-assembly is moved toward the housing 20 on a stationary part to clamp the peripheral edge of the diaphragm against the flange 22 as shown in Fig. 5. When in this position the flange 23 is spun around flange 22. After the flange 23 is spun around the flange 22, the unit is removed and the screw 27 is threaded into the bushing until the shim 70 frictionally engages the end of bushing 25. This fixes the relation of the end 71 with respect to the spun over end of the rivet 37.

After the screw 27 has been tightened in position as indicated above, the rod 60 is placed in the passage 53 of the tubular mounting bracket 52 with the inner end extending into the recess 38 while the other end extends beyond the ferrule. With the rod positioned the ferrule or tubular bracket 52 is threaded into a frame, not shown, and the other end of the rod will be associated with a device to be operated on movement of the diaphragm 24 in response to suction created in the unit on the side of the diaphragm containing the springs 45 and 46. Reduction of suction in the unit will permit the springs 45 and 46 to move the diaphragm toward the left and this rod will be moved in the same direction in accordance with the drop in suction created by an external source in the intake manifold suction pressure of an engine.

While the embodiment of the present invention as herein disclosed, constitutes a preferred form, it is to be understood that other forms might be adopted.

What is claimed is as follows:

1. A control mechanism comprising a casing; a diaphragm secured to the casing; a spring seat carried by the diaphragm; a second spring seat located in the casing; spring means located between the seats and urging the seats respectively toward ends of the casing; a tubular member threadedly secured to one end of the casing and having a reduced portion passing through the second spring seat and providing a seat for the second spring seat to move it away from said one end of the casing as the tubular member moves into the casing, said reduced portion of the tubular member engageable with first spring seat for limiting the movement of the diaphragm toward said one end.

2. In a control mechanism the combination of a casing; a diaphragm supported by the casing; a first spring seat associated with the diaphragm; a second spring seat located in the casing; a tubular member adapted to be connected with a source of suction threadedly mounted in one end of the casing for adjustment toward and away from the first spring seat, said member having a reduced portion extending through the second spring seat, said reduced portion forming a shoulder against which the second spring seat rests; spring means between the seats for urging the first spring seat and diaphragm in one direction, said reduced portion of the tubular portion adapted to be engaged by the first spring seat for limiting the movement of the diaphragm in the opposite direction by suction.

3. In a control mechanism the combination of a casing; a diaphragm mounted in the casing; a seat associated with the diaphragm; a second seat; a tubular member adapted to be connected with a source of suction, said tubular member adjustably connected with the casing for moving the second seat within the casing and having its inner end spaced from but adjacent to the first seat; resilient means held under compression between the seats for urging the first seat and diaphragm in one direction relative to the second seat, said inner end of the tubular member adapted to be engaged by the first seat for limiting the movement of the diaphragm in the opposite direction by suction.

4. A control mechanism comprising, a first housing member, a second housing member, a diaphragm, said housing members having engaging flanges for securing and clamping the periphery of the diaphragm therebetween; an operating rod associated with said diaphragm and extending through an aperture in said first housing member; a spring seat carried by the diaphragm; a second spring seat located in the second housing member; a pair of springs located between the seats and urging the seats respectively toward the housing members; a tubular member threadedly secured to the second housing member and having one end passing through the second spring seat and provided with an external shoulder for engaging the second spring seat to move said seat from the second housing member as the tubular member moves therein, said mentioned one end of the tubular member engageable by the first mentioned spring seat to limit the movement of the diaphragm toward the second housing member.

MAX G. BALES.

References Cited in the file of this patent

UNITED STATES PATENTS

| Number | Name | Date |
|---|---|---|
| 1,712,657 | Frankenberg | May 14, 1929 |
| 1,984,595 | Pfening et al. | Dec. 18, 1934 |
| 1,999,285 | Davis | Apr. 30, 1935 |
| 2,015,374 | Baker | Sept. 24, 1935 |